United States Patent [19]
Morris et al.

[11] 3,785,396
[45] Jan. 15, 1974

[54] TAMPER-PROOF, FLUID FLOW CONTROL SYSTEM

[76] Inventors: Earl L. Morris, 1501 N. Cloister Rd., Whittier, Calif. 90603; Theodore J. Sally, 7236 Friends Ave., Whittier, Calif. 90602

[22] Filed: July 5, 1972

[21] Appl. No.: 269,090

[52] U.S. Cl. .................... 137/359, 4/192, 137/217, 137/360, 137/613
[51] Int. Cl. ......................................... F16k 11/10
[58] Field of Search ................ 4/191, 192; 137/217, 137/356, 357, 359, 360; 251/DIG. 1, 295; 285/DIG. 19; 4/203

[56] References Cited
UNITED STATES PATENTS

| | | | |
|---|---|---|---|
| 1,627,020 | 5/1927 | Dougherty | 251/295 X |
| 2,997,058 | 8/1961 | Hall | 137/360 |
| 3,118,464 | 1/1964 | McClenahan | 137/360 |
| 1,929,522 | 10/1933 | Schulte | 251/295 |
| 2,741,258 | 4/1956 | Bletcher et al. | 137/217 |
| 2,799,289 | 7/1957 | Mustee | 4/192 X |
| 2,116,806 | 5/1938 | Zinkil et al. | 251/295 X |
| 2,245,934 | 6/1941 | Mullett | 251/295 X |

*Primary Examiner*—Alan Cohan
*Assistant Examiner*—Gerald A. Michalsky
*Attorney*—Ben E. Lofstedt

[57] ABSTRACT

A tamper-proof, pushrod-activated fluid flow control mechanism is described which incorporates a means for externally adjusting the length of the pushrod used to actuate the fluid flow control valve for varying such parameters as fluid, flowrate and fluid flow time delay without requiring disassembly or the addition or removal of a part from the mechanism. Compactness of the mechanism assures rapid installation or removal from the pipe chase area without impairing the operation of the user controls which are typically exposed to tampering by users. Provision is made for the installation, as desired, of fluid flow control limiting and/or vacuum breaking devices.

7 Claims, 5 Drawing Figures

TAMPER-PROOF, FLUID FLOW CONTROL SYSTEM

BACKGROUND OF THE INVENTION

1. Field of the Invention

The invention lies in the field of tamper-proof fluid flow control mechanisms having externally adjustable fluid flowrate and time delay mechanisms.

2. Description of the Prior Art

Fluid flow control systems such as valves, orifices and similar devices are well known in the art. Fluid flow control devices have also been constructed which incorporate an adjustable time delay feature. The time delay mechanism serves as a means for controlling the amount of time during which the fluid is allowed to flow, or is prevented from flowing, from one point to another. It is also commercially desirable to have a means for externally adjusting the mechanism to control fluid flowrate. Such adjustable features permit the mechanism to be flexibly adapted to a wide range of design requirements and applications. Broadening the range of product applicability to a diversity of parametric requirements achieves certain economies. Economies are effected simply because a single time delay or flowrate control mechanism can function in a greater number of applications, thereby reducing the number of different devices required to cover the same range of design requirements.

As found in the prior art, adjustable, non-electrical fluid flow control or time delay devices are adjusted via an internal adjustment or a parts change. Both necessitate disassembly of the fluid flow control and/or time delay mechanisms. Such disassembly is not desirable because it is time-consuming and costly. Should an adjustment be necessary, it is preferable to accomplish the adjustment by means of an externally accessible adjustment which does not require any disassembly of the unit.

Additionally, in many types of installations, it is extremely desirable, and oftentimes required, to incorporate such an adjustable fluid flow or time delay mechanism in the plumbing which is tamper-proof to prevent alteration by unauthorized personnel. Such a requirement typically exists when the device is installed in public institutions, such as air terminals, gas stations, schools, penal institutions, and the like.

In adapting fluid flow control activating mechanisms, such as valve control handles and the like, for use with plumbing facilities provided to the public or for similar institutional applications, care must be taken to design said devices so that they are tamper-proof. Losses caused by vandals represent large sums of money and the replacement of the fixtures often greatly exceeds their monetary value or the goodwill generated by making them available to the public.

In addition, when such devices are installed in prisons or jails, the problems associated with their removal are further compounded. NOt only may the plumbing facilities be rendered inoperative or useless with regard to their intended function, but, when removed, are likely to be used as tools or weapons. Since most durable plumbing fixtures are constructed of relatively heavy metals, their potential use as a weapon presents a very real and serious threat to others, and may also be used to produce serious self-inflicted injuries as well. Consequently, such fixtures must be designed so that they cannot be removed from the side which is accessible to the users of said facilities. However, said fixtures must be readily removable by authorized service personnel.

The invention described herein is easily installed by a licensed plumber, and is virtually impossible for unauthorized persons, such as vandals, to remove since it is secured to the wall or partition of the plumbing unit, such as a lavatory, from the rear.

Prison plumbing fixtures in the prior art combined both the valve actuating means and the liquid control and/or time-delay valves in a single housing. If valve repairs were necessary, both the valve and the valve actuating means had to be removed, necessitating the disassembly of numerous threaded connections. In order to effect repairs with some devices in the prior art, the plumber had to enter the prison cell. For safety reasons, prisoners occupying the cell were removed to another holding facility while repairs were made. This procedure was time-consuming, expensive and offered an opportunity for a breach of prison security. The present invention eliminates all of the above problems, by not placing the valve actuating mechanism and the water control and/or time-delay valves in a single housing so that they are exposed to the user area, and, by providing for removal of the unit for repair without requiring service personnel to enter the prison cell area or necessitating the removal of the user's valve actuating means.

Handles or other hand-gripping devices for actuating the water control valve and time-delay mechanism are generally unsuitable for use in institutions such as prisons. Such devices are susceptible to being twisted off or unscrewed from their associated anchoring and actuating means or of being pried from said mountings.

Frequently, similar pipe-chase mounted fluid control mechanisms and their associated manifold housings which are not exposed to the users' area are joined with the other plumbing and plumbing fixtures in such a manner as to require numerous threaded attachments. The time required for either installation or removal of the unit for repair or replacement is generally substantial, and consequently, represents considerable expense. By limiting threaded attachments to those which are minimally required, as is accomplished by the invention disclosed herein, a significant commercial advantage is achieved since the installation or removal time is greatly reduced, which, in turn, lowers the costs of installation and removal.

Many prior devices of this type are not of compact design which, of course, restricts their use and application to large volume areas having relatively interference-free accessways. Oftentimes, the pipe chase is filled with larger associated plumbing items and space is at a premium. Consequently, compactness is a commercially-valuable feature.

Additionally, the creation of a compact assembly is desired in order to reduce the amount of metal used in the cast manifold body, so as to conserve the total amount of metal used in said casting to an optimal amount and to reduce the total weight of said assembly. The reduction of unnecessary additional weight can be an expense adding factor in large multi-storied buildings as it reduces the structural safety factor and/or increases the cost of structural reinforcement.

And still further, many prior art fluid flow controls failed to include the highly desirable feature of incorporating the feature of interchangeably receiving a flow rate limiting device or vacuum breaker unit.

SUMMARY OF THE INVENTION AND OBJECTS

The present invention comprises a compact fluid manifold body and fluid flow control receptacle, wherein said flow control is typically activated by a vandal-proof push button and escutcheon assembly which, in turn, acts against a pushrod. The pushrod is axially spring-loaded by means of one arm of a spring-loaded pivotable fulcrum, the opposite arm of which is disposed so as to contact the axially-displaceable control shaft of the fluid flow control valve when the push button is depressed.

When the valve is actuated, fluid is permitted to flow from a fluid source through the intake passageway within the manifold body to an outlet passageway. The fluid flow time may be regulated by means of an adjusting assembly mounted on the end of the pushrod for effectively controlling the length of said pushrod. The pushrod is coupled to the fulcrum arm in such a manner that when the effective length of the pushrod is increased, the opposite end of the fulcrum arm is brought closer to the activating shaft of the fluid flow control valve. The degree of control is directly proportional to the amount by which the control shaft is displaced into the valve. By positioning the fulcrum arm further away from or nearer to the control shaft, the effective length of control shaft travel or displacement may be varied from its minimum control to its maximum control capability.

In addition, the manifold body contains a receptacle whereby a fluid flowrate limiting device may be received so that the rate of fluid flow may be limited to a specific maximum value, independent of the control valve setting. However, in the event that it is not necessary or desired to incorporate a flow rate limiting device into the manifold, the same receptacle in the manifold may be used to receive a vacuum breaker or "antisyphon valve" instead.

Further, the manifold body possesses a fluid intake passageway having oppositely-disposed inlet ports to permit the plumbing fixture supplying the fluid to be joined in fluid communication with the passageway in the manifold body at either the top or the bottom portion of said manifold.

The fluid outlet port and passageway is matingly joined so as to sealingly engage the fixed fluid delivery pipe using a sleeve-and-O-ring assembly. Engagement is effected by merely sliding the fluid outlet port over the sleeve-and-O-ring assembly of the fixed fluid delivery pipe or tube.

In addition, the pushrod may be removed from the push button and escutcheon assembly without affecting the operation or the vandal-proof nature of the push button and escutcheon assembly.

An object of the invention is to provide a fulcrum assembly which can be readily removed for replacement with either the same assembly or with an assembly with a different mechanical advantage.

An object of the invention is to provide a tamper-proof, pushrod-actuated fluid control valve assembly which may be rapidly installed or removed from the pipe chase area. Accordingly, no fasteners are exposed to the cell area.

Another important object of the invention is to provide a fluid flow control valve assembly which may be adjusted via external means without requiring disassembly of the addition of removal of any parts.

A still further object of the invention is to provide a means for external valve adjustment which can be completely and rapidly disconnected from the push button and escutcheon assembly without impairing the operability of said push button within the escutcheon or affecting its vandal-proof feature.

A still further object of the invention is to provide a means for guiding and restricting the rearward axial movement of the push button to a pre-determined, fixed maximum stroke so that it cannot be depressed so far into the body of the escutcheon so as to produce a temporary or permanent binding of the push button which would prevent the push button from returning to its fully extended position.

Another important object of the invention is to provide a compact fluid flow control system attachable to a partition or hollow standard and free from numerous adjustable parts which can be rapidly installed and removed by authorized personnel.

A further object of the invention is to provide the fluid inlet passageway of said manifold body with an alternate receptacle or port whereby said fluid source may be connected to the fluid inlet passageway from either the upper or lower portion of said manifold body.

A still further and important object of the invention is to provide a means for biasing the push button so as to maintain the unactuated push button in its fully extended position, outwardly from said escutcheon and wherein said means is capable of being removed or installed by simply removing or installing said manifold body.

Another object of the invention is to provide a means for preventing the bypassing of hot and cold water so that the hot and cold waters are properly blended and discharged at the desired temperature and to prevent the hot water supply from discharging into the cold water supply and vice versa.

A still further object of the invention is to provide a means for minimizing the amount of force necessary to operate the pushrod linkage for activating the fluid flow control system.

A further object of the invention is to incorporate a receptacle in the manifold body which permits the installation of either a fluid flow rate limiting device or a vacuum breaker unit.

These and other objects will be apparent from the following description of an illustrative embodiment shown in the appended drawings wherein:

DESCRIPTION OF THE PREFERRED EMBODIMENT

Figure 1:
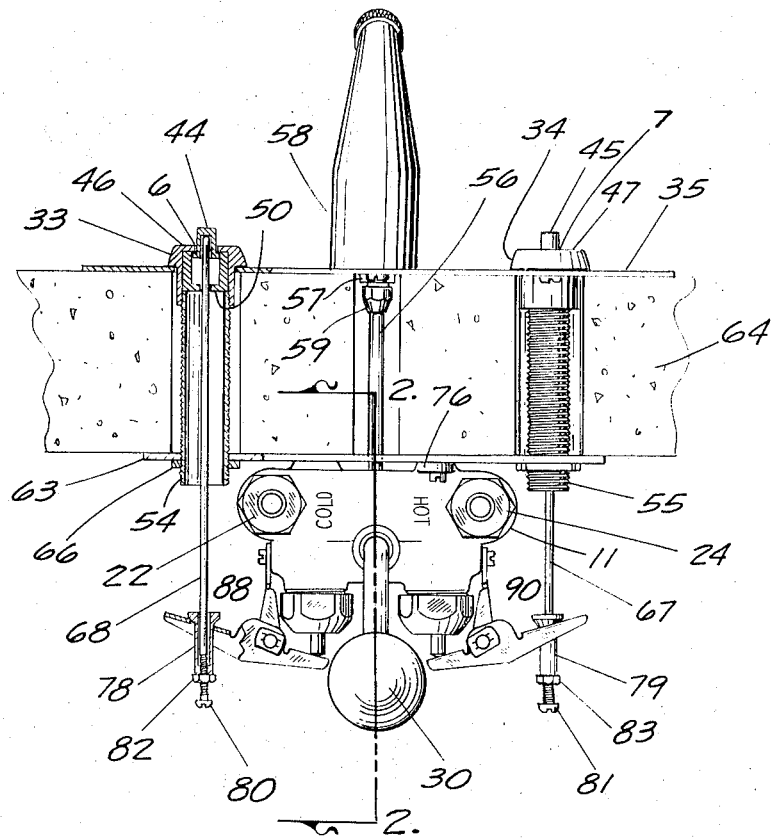
FIG. 1 is a plan view of the double valve manifold body, the valve actuating means and the fluid discharge pipe, the entire assembly shown installed in a cross-section of a wall or partition.

With continued reference to the drawings, a manifold body 11 is provided having a continuous fluid passageway 12 therein. As shown in this embodiment, the manifold body 11 has eight receptacles: 13, 14, 15, 16, 17, 18, 19, and 20. Receptacles 19, 20 are oppositely and, respectively, disposed to receptacles 16, 15 and are in fluid communication with each other. The oppositely-disposed, paired receptacles 15, 20 and 16, 19 each serve as receptacles for the cold and hot water inlet valves 21, 23. Both valves 21, 23 are installed in the segments of the passageway 12 through receptacles 16, 19 and 15,20. Typically, the valves 21, 23 have integral check stops which prevent the bypassing of hot and cold water so that the water is properly blended within the manifold passageway 12 to produce the desired discharge temperature and to prevent the water from flowing from one source and discharging into the other source.

Figure 5:
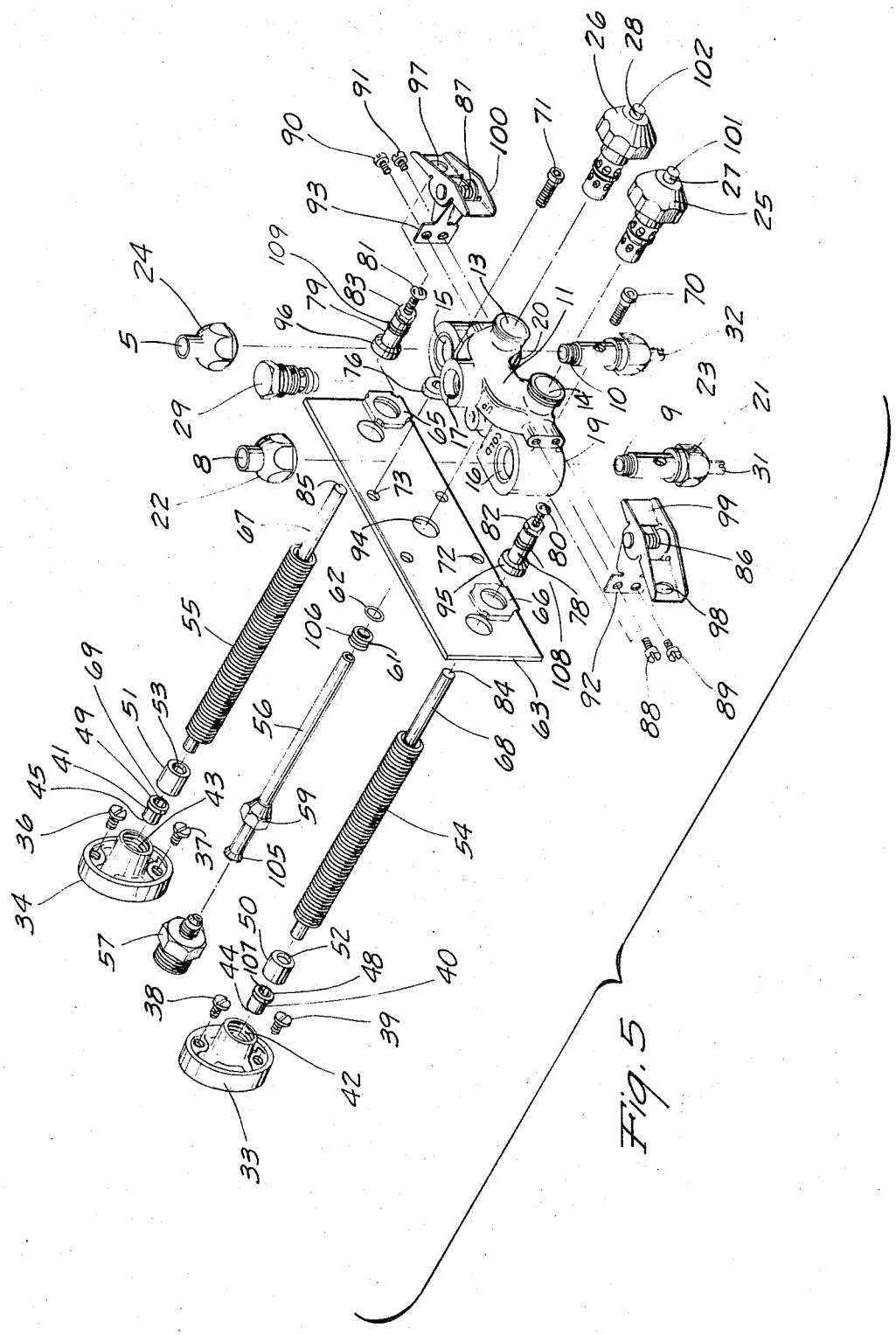
FIG. 5 is an exploded isometric assembly view of the fluid flow control system, depicting the parts of one embodiment thereof and their interchangeable relationships.

As shown in FIG. 5, the valves 21, 23 are to be respectively adapted to be sealingly mated with the receptacles 19 and 20. When fully mated, the threaded ends 9, 10 protrude out of ports 16, 15. Water is received by ends 8, 5 of the threaded nuts 22, 24 which are threadably adapted to be received by the threaded ends 9, 10 of valves 21, 23. The nuts 22, 24 are tightened to retain the valves 21, 23 in a fixed, sealingly mated position. The valves 21, 23 are adjusted by means of slotted shafts 31, 32.

It should be noted that the valves 21, 23 and threaded nuts 22, 24 may be installed as shown, or reversed for connection to water supplies from above or below the manifold 11, as may be required by the particular requirements of the installation.

Referring again to FIG. 5, fluid flow control valve cartridges 25,26 which may be either time-delayed or non-time-delayed types are threadably installed, respectively, in the threaded mating receptacles 14, 13 in the manifold 11. If time-delayed valve cartridges are used, the time period during which the water is permitted to flow through the control valves 25, 26 can be typically varied from 1 to 20 seconds. The time delay period is dependent upon the amount by which the flow control shafts 27, 28 are displaced into the body of the valves 25, 26. The greater the amount of axial shaft displacement into the valve bodies 25, 26, the longer is the time delay. In other words, the longer the time delay, the longer is the time period during which the water will flow through the manifold passageway 12.

Figure 2:
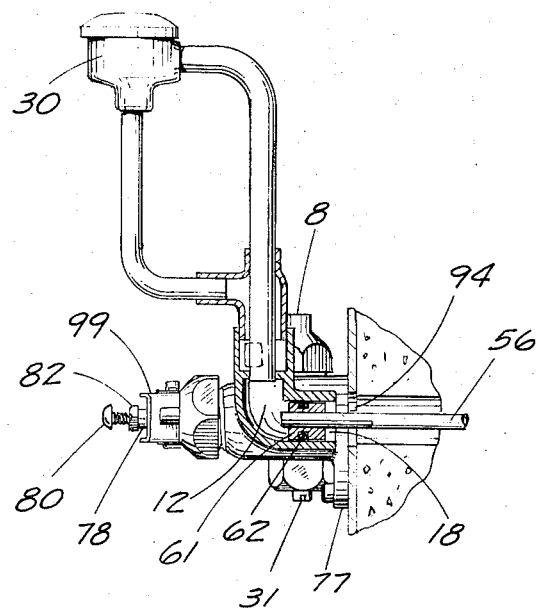
FIG. 2 is a side elevational view of a double valve manifold body with a cutaway section of the fluid outlet passageway, 2—2, depicting the placement of the vacuum breaker device and the means whereby a sealing engagement with the fixed fluid discharge pipe is effected.

Referring once again to FIG. 5, receptacle 17 is adapted to threadably receive a flowrate limiting device 29, or a vacuum breaker unit 30 as shown and illustrated in FIG. 2.

As illustrated in both FIGS. 1 and 5, the escutcheons 33, 34 are typically installed in the lavatory splash panel 35 and fastened thereto by means of threaded fasteners 36, 37, 38 and 39. The push buttons 40, 41 are passed through the rear, enlarged threaded passageways 42, 43 of the escutcheons 33, 34. The front, exposed faces 44, 45 of the push buttons 40, 41 are passed through smaller, smooth-bored apertures 6, 7 of the face of the escutcheons 33, 34 which are slightly larger in diameter than the diameter of the body of the push buttons 40, 41 to allow the push buttons 40, 41 to protrude beyond the faces 46, 47 of the escutcheons 33, 34. The push buttons 40, 41 are prevented from passing through the aperatures 6, 7 by means of the annular flanged portions 48, 49 of the push buttons 40, 41 which are larger in diameter than the aperatures 6, 7 in the escutcheons 33, 34, and, therefore, are prevented from passing completely therethrough.

Bushings 50, 51 having radial, inwardly extending flanges 52, 53 near the rear portion thereof are inserted into the rear passageways 42, 43 of the escutcheons 33, 34. The bushings 50, 51 serve as a stop for the push buttons 40, 41 for limiting the maximum stroke of the push buttons 40, 41. The push buttons 40, 41 are stopped when the annular flanged portions 48, 49 of the push buttons 40, 41, which are slideably disposed within the bushings 50, 51, contact the flanges 52, 53 of said bushings 50, 51.

Following the installation of the bushings 50, 51, the externally-threaded pushrod guides and anchoring sleeves 54, 55 are threadably mated with the threaded rear passageways 42, 43 of the escutcheons 33, 34, and rotated until they are placed in an abutting relationship with the flanged portions 52, 53 of the bushings 50, 51.

Figure 3:
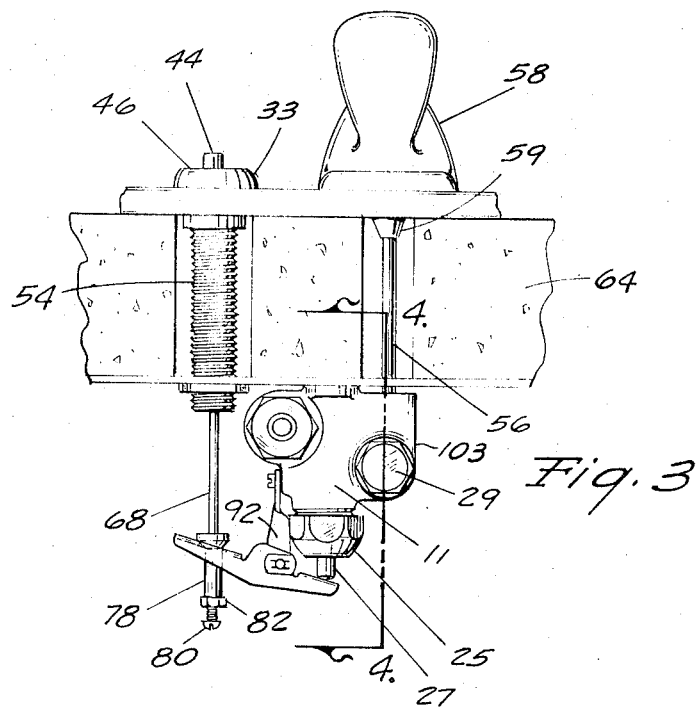
FIG. 3 is a plan view of a single valve manifold body and the means for actuating the valve.

Next, the fluid delivery tubing 56 typically is sized in the field for a custom fit, cut and flared so that it can be sealingly mated with a threaded adapter 57 wherein said threaded adapter 57 may be threadably mated to the fluid discharge fixture, such as the water spout 58 shown in FIG. 3. The flared end 105 of the fluid delivery tubing 56 is joined with the threaded adapter 57 by means of a nut 59.

The opposite end of the fluid delivery tubing 56 is fitted with a grooved ferrule 61. An O-ring seal 62 is fitted within the groove 106 of the ferrule 61.

A perforated backing plate 63 is then installed flush against the wall or portition 64. The pushrod guides and anchoring sleeves 54, 55 and the fluid delivery tubing 56 pass freely through the perforated backing plate 63. Nuts 65, 66 are threadably mated with the pushrod guides and anchoring sleeves 54, 55 and tightened so as to place the backing plate 63 flush against the wall or partition 64.

The pushrods 67, 68 are installed by passing them into the tubular pushrod guides and anchoring sleeves 54, 55 until they are nested in the recesses 69, 107 in the push buttons 40, 41.

The fluid discharge port 18 in the manifold body 11 is then aligned with the ferrule 61 through the aperature 94 and mated therewith to effect a fluid seal.

The manifold body 11 is attached to the backing plate 63 via threaded fasteners 70, 71 which are screwed into the threaded holes 72, 73 after being passed through the holes in the fingers 76, 77 of the manifold body 11.

The timing sleeves 78, 79 with screws 80, 81 and locknuts 82, 83 are placed over the pushrod ends 84, 85. The spring-loaded, pivotable fulcrum arms 86, 87 which are pivotably attached to the rocker arms 92, 93 and, which in turn, are attached to the manifold body 11 via threaded fasteners 88, 89. 90, 91, each have a single perforation 97, 98 therein, through which the timing sleeves 78, 79 are passed. The annular flanged portions of the timing sleeves 78, 79 serve as stops for the fulcrum arms 86, 87 thereby allowing a bias force to be transmitted to the pushrods 67, 68 and forcing the push buttons 40, 41 outward to their fully-extended positions.

Due to the fact that the threaded ends of the screws 80, 81 lie within the timing sleeves 78, 79, said ends are placed against the ends 84, 85 of the pushrods 67, 68. By adjusting the screws 80, 81, the opposite ends 99, 100 of the fulcrum arms 86, 87 may be adjusted away from or towards the exposed ends of the axially-displaceable control shafts 27, 28. By adjusting the screws 80, 81, the fulcrum arms 86, 87 and, the ends 99, 100 are caused to move inwardly towards or away from the fluid flow control shafts 27, 28. When the push buttons 40, 41 are depressed, the fulcrum arms 86, 87 and the ends 99, 100 thereof, will contact the control shafts 27, 28 causing them to move inwardly into the control valve bodies 25, 26. The greater the amount of inward displacement, the longer is the time delay or fluid control. Typically, when a time delayed valve is used, time delays ranging from 1 to 20 seconds are achieved. This can be, of course, increased as necessary and should not in any way be regarded as limiting or restrictive.

Once the screws 80, 81 are adjusted as desired, the screws 80, 81 are locked in position within the timing sleeves 78, 79 by means of locknuts 82, 83.

Figure 4:
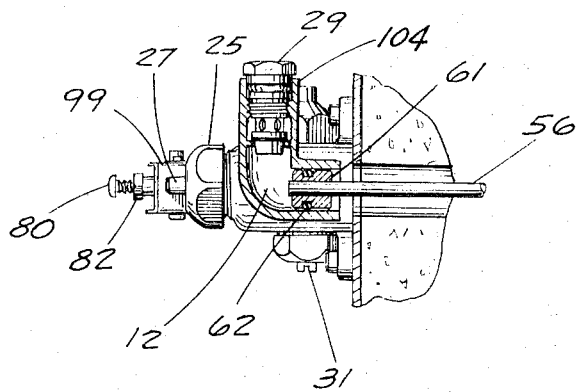
FIG. 4 is a side elevational view and partial cutaway section, 4—4, of the single valve manifold body of FIG. 3.

Referring now to FIGS. 3 and 4, it is clearly shown that a single push button-activated fluid flow control assembly with externally-adjustable pushrod can be easily derived from the embodiment hereinbefore described.

Furthermore, it will be apparent from the foregoing that the novel fluid flow control assembly described herein may be employed in applications other than discussed above. Such additional applications are also fully intended to be covered in the appended claims to the extent that they are not excluded therefrom. It should also be noted that numerous modifications may be made in the preferred embodiment of the invention without exceeding its scope.

We claim:

1. A fluid flow control system comprising:
    a fluid manifold having an inlet, an outlet and an interconnecting channel therebetween;
    a fluid flow control valve disposed within said channel, said valve having an axially displaceable control shaft extending therefrom;
    an inlet valve, separate and independent from said fluid flow control valve, disposed within the inlet of said fluid manifold, said inlet valve having external means for regulating the flow of fluid therethrough;
    a spring biased fulcrum arm secured to said manifold said fulcrum arm having a first end adapted to rest in complementary relationship to the free end of said control shaft and a second end having an opening therein extending away from said control shaft;
    a timing sleeve having a flange adjacent one end thereof, said timing sleeve adapted to extend through the opening in said second end of said fulcrum arm whereby said fulcrum arm abuts the flange of said sleeve and said sleeve is prevented from passing through the opening;
    actuating means adapted to axially displace said timing sleeve, whereby said first end of said fulcrum arm is caused to depress said axially displaceable control shaft; and
    means secured to said timing sleeve for varying the axial displacement of said control shaft independently of the axial displacement of said timing sleeve and said axially displacing means, whereby the fluid flow can be regulated independently of inlet flow and said actuating means.

2. A fluid flow control system in accordance with claim 1, wherein said actuating means comprises:
    a push button having an axially disposed central passageway therein with an open end and a closed end,
    a pushrod disposed within the passageway of said push button, the opposite free end of said push rod disposed in complementary relationship to said timing sleeve, whereby axial displacement of said push button causes a corresponding axial displacement of said timing sleeve.

3. A fluid flow control system in accordance with claim 2, wherein said means for varying the axial displacement of said control shaft comprises a member disposed within said timing sleeve for adjusting the combined length of said timing sleeve and said push rod.

4. A fluid flow control system in accordance with claim 3, wherein said member for adjusting the combined length of said timing sleeve and said push rod is threadably engaged with said timing sleeve and adapted for adjustment without removing said timing sleeve from said push rod or from said fulcrum arm.

5. A fluid flow control system in accordance with claim 2, wherein said fulcrum arm is pivoted intermediate its ends, whereby axial displacement of said timing sleeve in a first direction causes a corresponding displacement of said first end of said fulcrum arm in a second opposite direction.

6. A fluid flow control system comprising:
    a fluid manifold having an inlet, an outlet and an interconnecting channel therebetween;
    a fluid flow control valve disposed within said channel, said valve having an axially displaceable control shaft extending therefrom;
    an inlet valve, separate and independent from said fluid flow control valve, disposed within the inlet of said fluid manifold, said inlet valve having external means for regulating the flow of fluid therethrough;
    a spring biased fulcrum arm secured to said manifold, said fulcrum arm having a first end adapted to rest in complementary relationship to the free end of said control shaft and a second end having an opening therein extending away from said control shaft, said fulcrum arm being pivotally supported intermediate its first and second ends;
    an escutcheon having an opening therein;
    a push button adapted to slide within the opening in said escutcheon, said push button having an axially disposed central passageway therein with an open end and a closed end, said closed end extending outwardly from the face of said escutcheon, said open end having a radially extending flange about its periphery whereby said push button cannot be removed from the face side of said escutcheon;
    a push rod disposed within the passageway of said push button;
    a timing sleeve having an axially disposed central passageway therein with an open end and a closed end, said open end having a flange around the periphery thereof, the open end of said sleeve is adapted to be slidably disposed over the free end of said push rod and the closed end of said sleeve is adapted to extend through the opening in the second end of said fulcrum arm, whereby the fulcrum arm abuts the flange of said sleeve and said sleeve is prevented from passing completely through said opening and axial displacement of said pushbutton causes a corresponding displacement of said first end of said fulcrum arm in an opposite direction; and means secured to said timing sleeve for varying the axial displacement of said control shaft independently of the axial displacement of said timing sleeve, whereby fluid flow is regulated independently of inlet flow and axial displacement of said push button.

7. A fluid flow control system in accordance with claim 6, wherein said means for varying the axial displacement of said control shaft comprises a member threadably engaged with said timing sleeve, said member adapted to regulate the depth that said push rod can penetrate the passageway of said timing sleeve and thereby the effective combined length of said push rod and said timing sleeve.

* * * * *